Sept. 18, 1962 J. M. R. BROCARD 3,054,578
ANNULAR AIRCRAFT WITH ELASTIC COLLECTOR RING RIM
Filed Oct. 7, 1958 11 Sheets-Sheet 1

Sept. 18, 1962 J. M. R. BROCARD 3,054,578
ANNULAR AIRCRAFT WITH ELASTIC COLLECTOR RING RIM
Filed Oct. 7, 1958 11 Sheets-Sheet 2

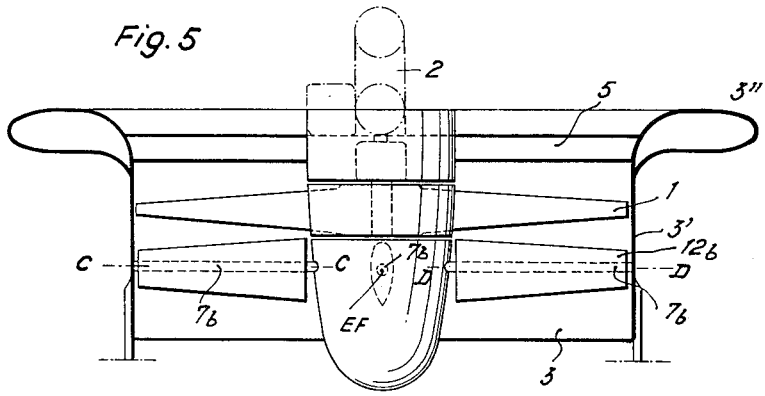
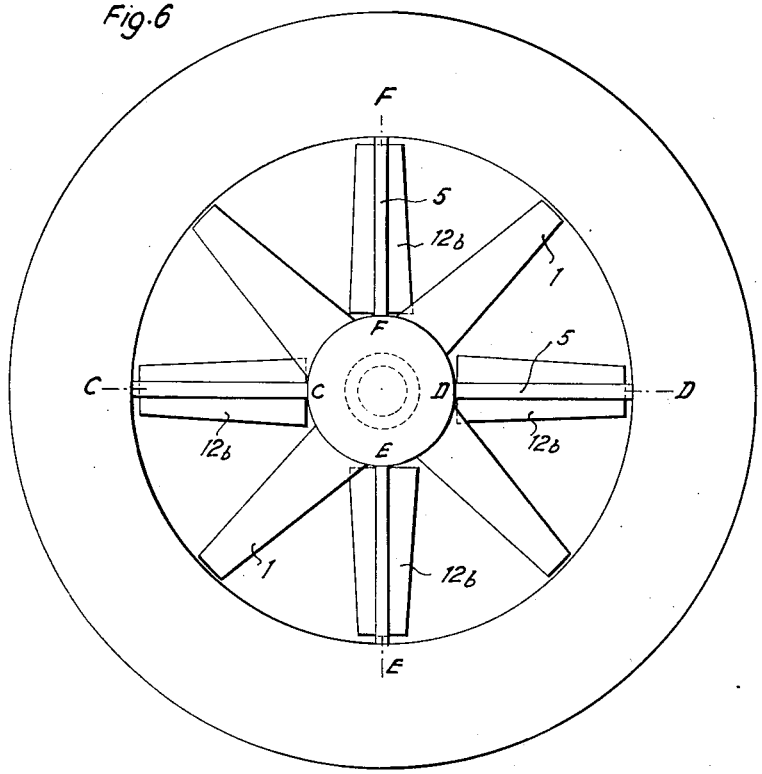

Sept. 18, 1962   J. M. R. BROCARD   3,054,578
ANNULAR AIRCRAFT WITH ELASTIC COLLECTOR RING RIM
Filed Oct. 7, 1958   11 Sheets-Sheet 4

Sept. 18, 1962 J. M. R. BROCARD 3,054,578
ANNULAR AIRCRAFT WITH ELASTIC COLLECTOR RING RIM
Filed Oct. 7, 1958 11 Sheets-Sheet 5

Sept. 18, 1962  J. M. R. BROCARD  3,054,578
ANNULAR AIRCRAFT WITH ELASTIC COLLECTOR RING RIM
Filed Oct. 7, 1958  11 Sheets-Sheet 6

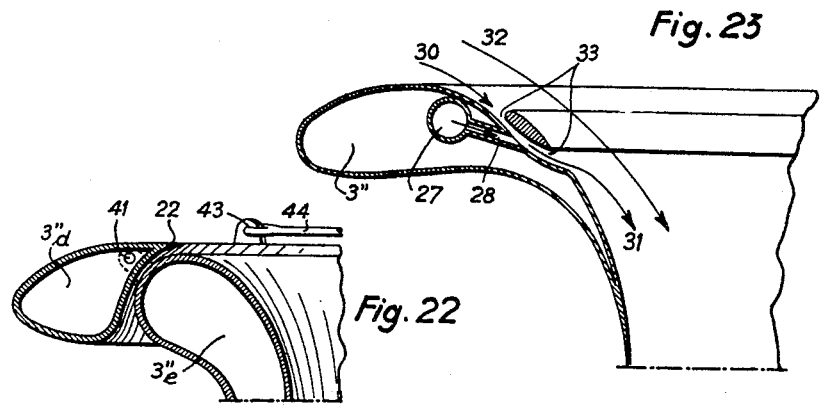
Fig. 23
Fig. 22
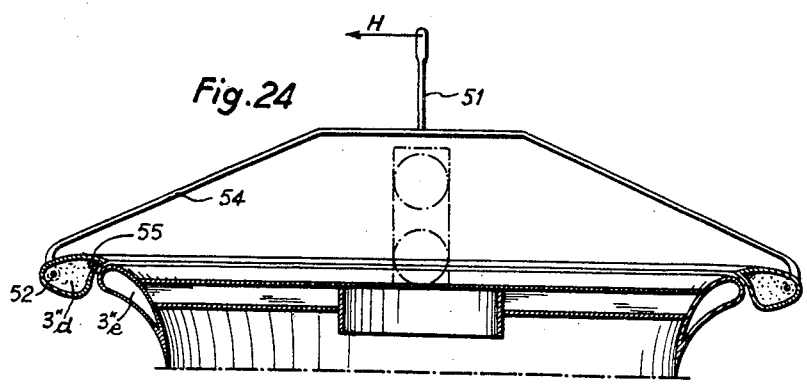
Fig. 24
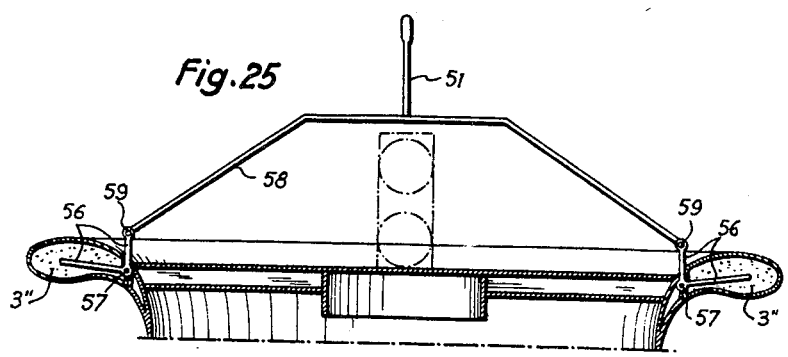
Fig. 25
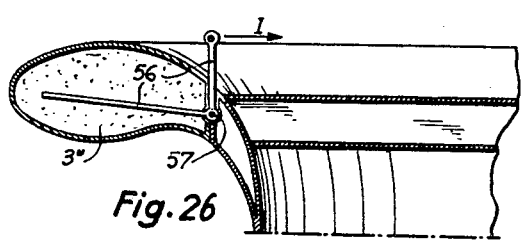
Fig. 26
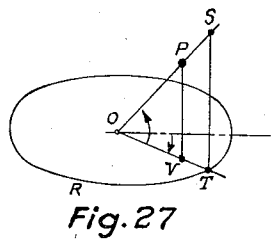
Fig. 27

United States Patent Office 3,054,578
Patented Sept. 18, 1962

3,054,578
ANNULAR AIRCRAFT WITH ELASTIC
COLLECTOR RING RIM
Jean Marie René Brocard, Paris, France, assignor to Compagnie de Recherches et d'Etudes Aeronautiques, Paris, France, a French corporation
Filed Oct. 7, 1958, Ser. No. 765,910
Claims priority, application France Oct. 8, 1957
5 Claims. (Cl. 244—23)

The invention relates to aircraft, and relates more particularly to aircraft that is either piloted or operated by remote control and that is capable of hovering, and capable of flight in any desired direction.

Still more particularly, the invention relates to means for stabilization and piloting control of such a craft.

It is among the principal objects of the invention to provide for such an aircraft that is easily maneuvered, simple to pilot and to stabilize.

The foregoing and other objects of the invention will be best understood from the following description of exemplifications thereof, reference being had to the accompanying drawings, wherein:

FIG. 5 is a schematic sectional view of a further modified aircraft;

FIG. 6 is a plan view thereof;

FIG. 8a is a plan view of the embodiment of FIG. 7a;

FIG. 15b is a plan view of a craft similar to that of FIG. 14b, but embodying the modification of FIG. 15a;

FIG. 22 is a large scale fragmentary schematic sectional view;

FIG. 23 is a large scale fragmentary schematic sectional view, similar to FIG. 18 but showing it in greater detail;

FIG. 24 is a schematic sectional view, showing a modification;

FIG. 25 is a schematic sectional view, similar to FIG. 16, right hand side, but showing it in greater detail;

FIG. 26 is a large scale fragmentary schematic sectional view, similar to FIG. 25; and FIG. 27 is a schematic perspective view, similar to FIG. 11, but showing it in greater detail.

Figure 2:
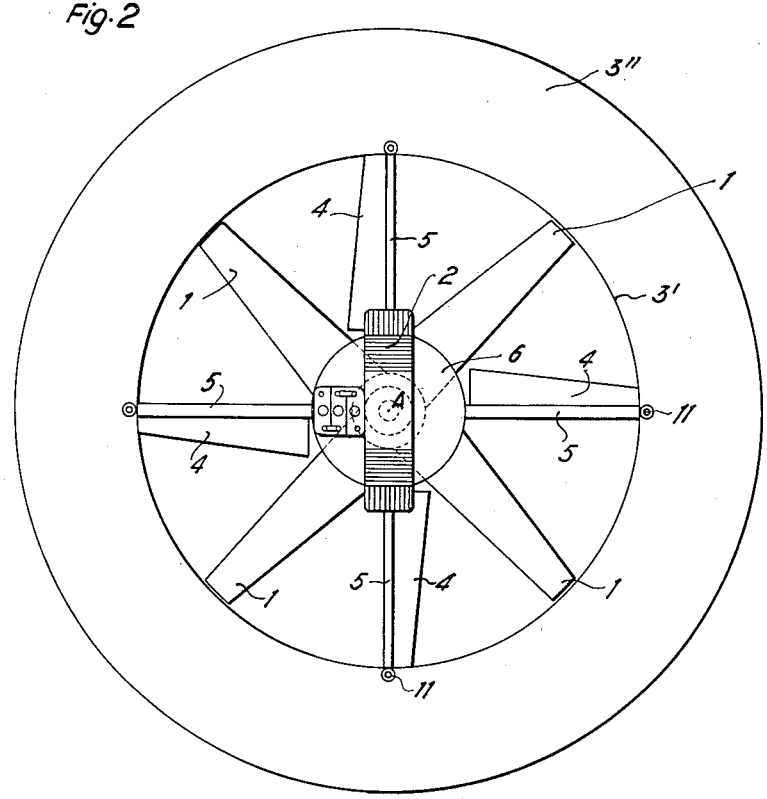
FIG. 2 is a plan view of the aircraft shown in FIG. 1.
Figure 1:
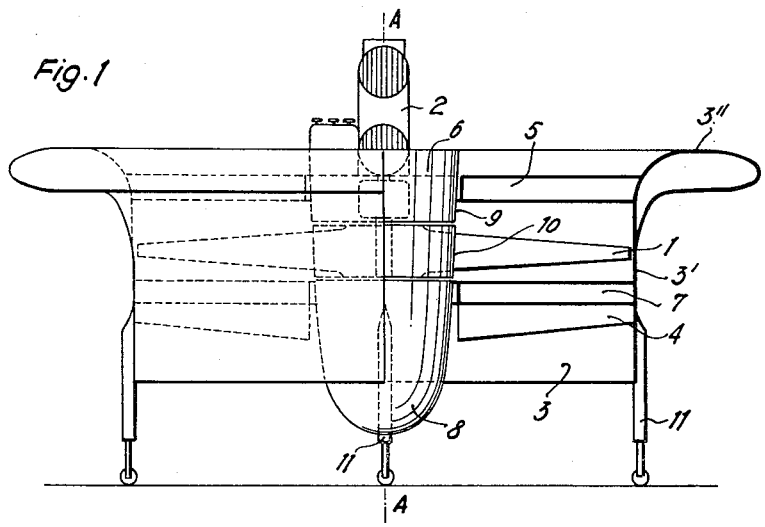
FIG. 1 is a schematic elevational view, partly in section, of an aircraft in accordance with one embodiment of the invention, the aircraft being shown standing on the ground.

In carrying the invention into effect in the embodiments which have been selected for illustration in the accompanying drawings and for description in this specification, and referring now particularly to FIGS. 1 and 2, there is provided a propeller 1 that is driven by a motor 2. The axis A—A of the propeller 1 and motor 2 coincides with the axis of a collector or fairing or fuselage 3. The collector 3 comprises a circular cowling portion 3' that may, as shown in FIG. 1, be cylindrical, and a collecting portion 3" that has a profiled top edge and that forms a convergence guiding air towards the propeller 1. The cowling portion 3' has an interior diameter which is only slightly in excess of the outer diameter of the propeller 1.

Instead of one propeller, two propellers (not shown) may be used rotating in opposite directions about the same axis and having oppositely directed blade pitch. Where two propellers are used, the collector and motor will not be subject to any reaction rotation moment.

Where, however, only a single propeller is used, the collector 3 and the motor 2 will not be subject to a reaction rotation moment oppositely relative to the rotation of the propeller. To restrain such reaction moment, fixed or adjustable compensating or deflector or corrector blades or flaps 4 are secured internally to the collector 3 downstream of the propeller 1, which receive air stream propelled by the propeller, and project into this propeller wash and are so arranged as to counteract the aforesaid reaction moment.

The means to counteract the reaction moment of the motor and the collector is not restricted to the exemplification of the previously described lower flaps 4. Such flaps may for this purpose be put upstream or downstream, or both, of the propeller, and where they are adjustable, they may be adjusted in proportion to the thrust delivered by the propeller 1. The exact forms of such flaps 4 will need to be calculated or established by tests.

A platform 6 is provided above the propeller 1, and is secured to the collector 3 by means of upper ribs 5. Lower ribs 7 connect a case 8 of the motor to the collector 3. The propeller 1 is suspended between the platform 6 and the case 8, and thus the propeller-1-and-motor-2-aggregate is supported by the collector 3.

The case 8 is designed to receive all or part of the payload of the aircraft; it may be extended, for aerodynamic reasons by a fixed case 9 which is attached to the platform 6 and by a removable case 10 which is carried and borne along by the propeller 1.

Ground engaging means, such as legs 11, are connected to the collector 3, to support the aircraft on the ground.

The motor 2 can be of any suitable design having the necessary power, and weight, in accordance with the specifications of the craft. The drive of the propeller may include a gear transmission (not shown).

The propeller 1 may have fixed or adjustable pitch, but the pitch should preferably be calculated so as to insure uniformity of circulation along the radius vector. The collector 3 is designed to eliminate marginal losses of the blades of the propeller 1.

The lip or edge of the outer portion of the collecting portion 3" should be so dimensioned, arrived at by calculation and test, as to avoid local breakaway of the air flow during flight.

In operation, the aircraft rises vertically under the effect of the thrust produced by the propeller 1, sucking the air in through the converging collecting portion 3", and blowing it downwardly as propeller wash through the remainder of the collector 3.

The aircraft can hover in the air, or move into any direction, as will be shown later on.

At standstill, the weight of the plane is balanced by the lifting thrust. Stabilizing and piloting is accomplished by various means, some of which are exemplified below.

Figure 3:
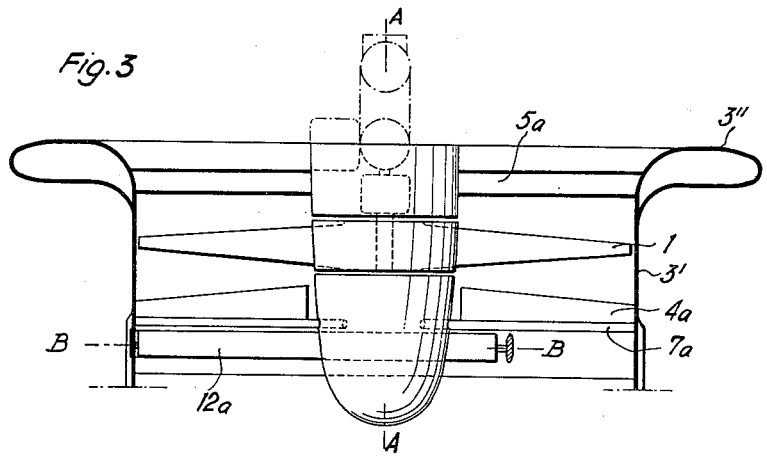
FIG. 3 is a schematic sectional view of an aircraft similar to FIG. 1, but embodying a modification.
Figure 4:
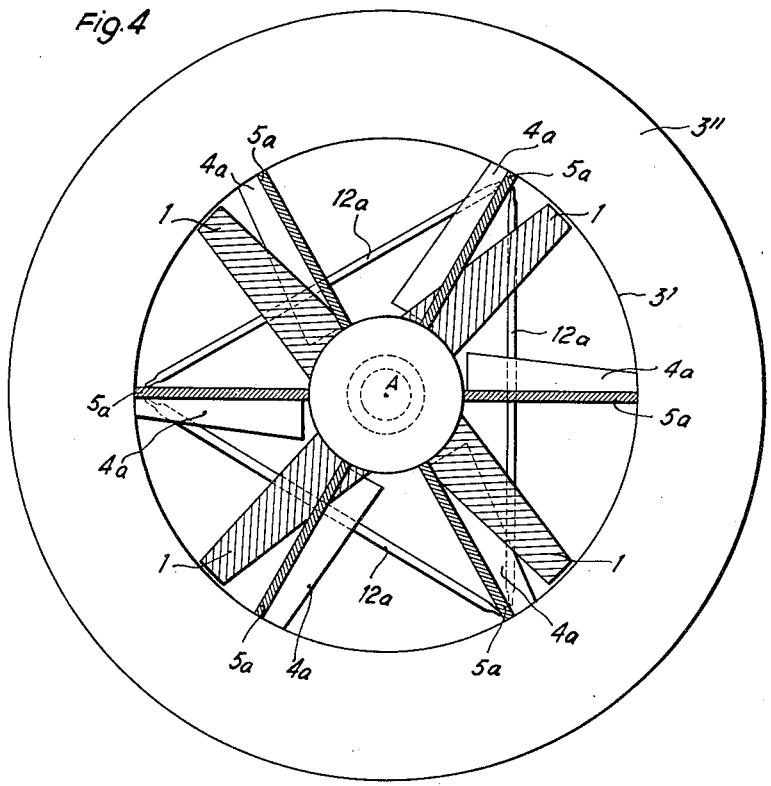
FIG. 4 is a plan view thereof, with the upper ribs and the propeller having been cross-hatched for a clearer understanding of the drawing.

In the modification of FIGS. 3 and 4, the upper ribs 5a and the lower ribs 7a are arranged according to sections. Compensating flaps 4a are placed on top of the lower ribs 7a. There are furthermore provided three stabilizer blades 12a, disposed in triangular form, which are separately adjustable around their axes, for instance the axis B—B. Turning of the blades 12a will provide for stabilization.

A still further means for stabilization and piloting is shown in FIGS. 5 and 6. Stabilizer blades 12b are movable around their axes CC, DD, EE and FF. These blades may be adjusted to adapt their action to the speed of the motor and hence to the thrust produced by the propeller 1, and there may be imparted to them a complementary rotation either individually or paired diametrically, in order to correct any dip taken by the plane.

In the modified versions of FIGS. 7a, 7b, 8a and 8b, fixed corrector flaps 4c are provided which interconnect the collector 3 with the case 8. Adjustable compensator flaps are provided (not shown) to compensate for the changes in the force of the propeller thrust, and these may be installed for instance upstream of the propeller. The stabilizing or straightening device may take one of two forms, one being shown in FIGS. 7a and 8a, and the other in FIGS. 7b and 8b.

Figure 7A:
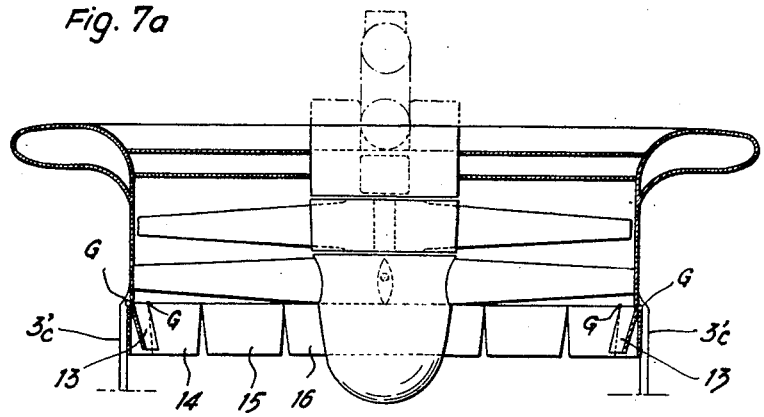
FIG. 7a is a schematic sectional view of a still further modified aircraft.
Figure 8A:
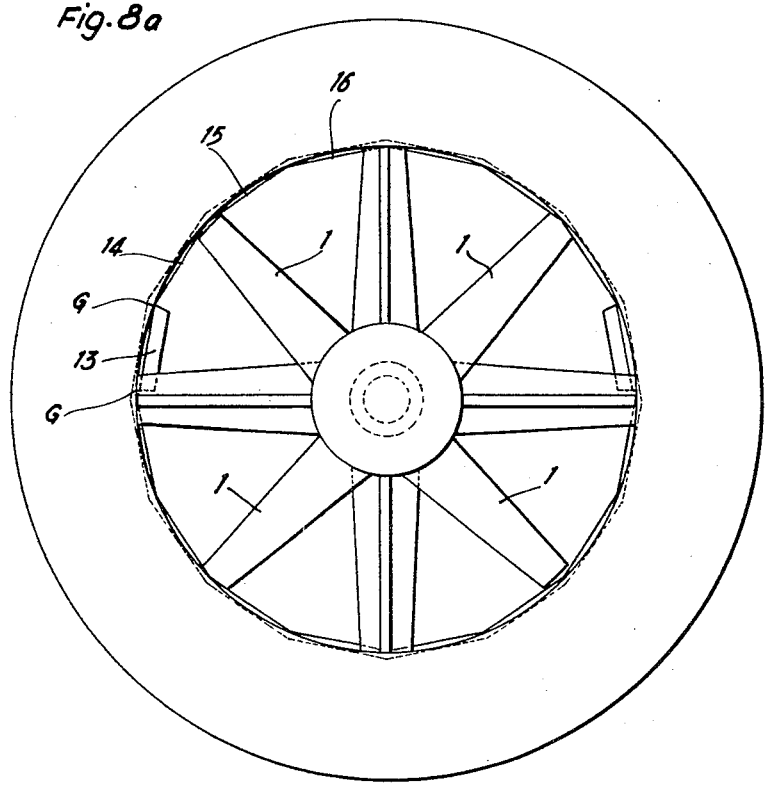

In FIGS. 7a and 8a there are shown stabilizer elements 13, 14, 15 and 16, which are applied against the lower portion 3'c of the collector 3 and can be moved inwardly and outwardly about horizontal axis G—G.

Figure 7B:
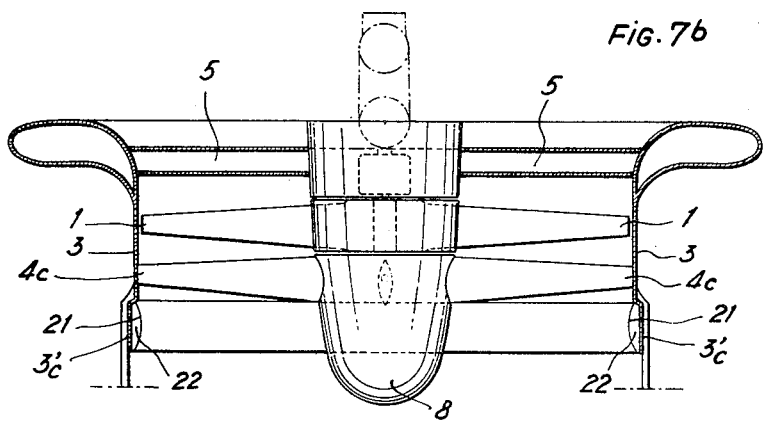
FIG. 7b is a schematic sectional view similar to FIG. 7a but showing a further modification.
Figure 8B:
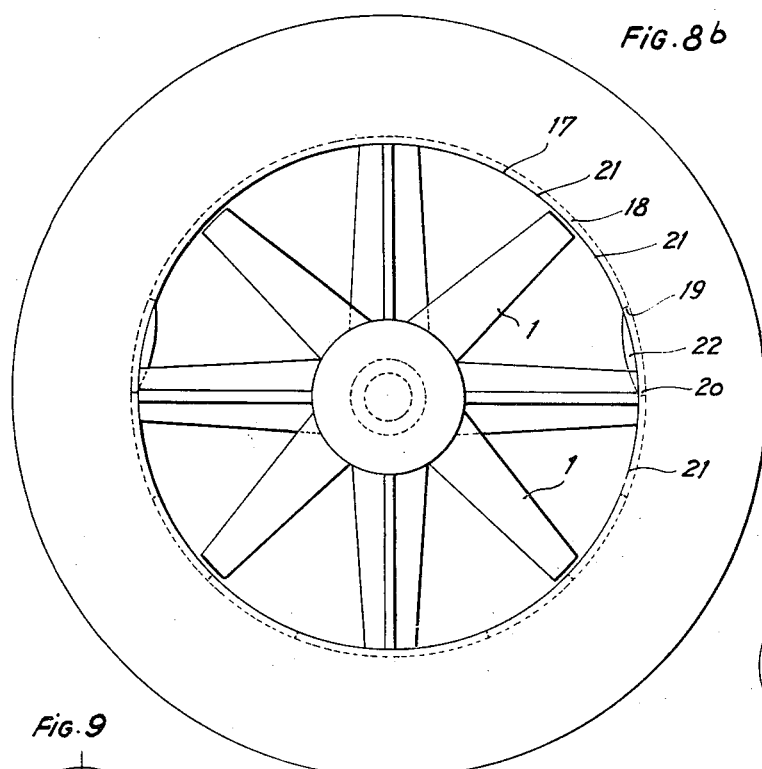
FIG. 8b is a plan view of the embodiment of FIG. 7b.

In accordance with the other possibility shown in FIGS. 7b and 8b, the lower portion 3'c of the collector 3 is lined on the inside with a flexible and deformable surface 21, for instance made of rubber, and shown at 17, 18, 19 and 20. By means of compressed air, or by means of a lever-actuated rod, the surface of each compartment 21 can be pushed radially inwardly, as shown at 22.

Figure 9:
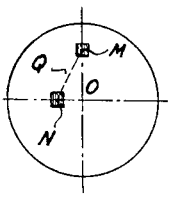
FIG. 9 is a schematic plan view illustrating shiftable masses for the changing of weight distribution in the craft.
Figure 11:
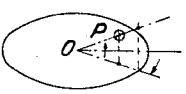
FIG. 11 is a schematic plan view, similar to FIGS. 9 and 10, but embodying a further modification.
Figure 10:
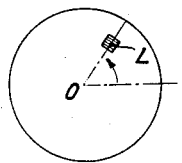
FIG. 10 is a schematic plan view, similar to FIG. 9, but embodying a modification.

Another way for re-establishing the stability of the craft may consist in a lateral displacement of the center of gravity of the craft in a direction opposite to that of the occasioned dip. This can be brought about by the shifting of a weight, for instance of a heavy movable part of the equipment like the electric battery. Stabilizing by means of weight shifting is shown in FIGS. 9–11. In FIG. 9, two masses N and M are shiftable according to two planes at right angle, and both planes coincide with the propeller axis The masses N and M are positioned at all times, however, in a plane at right angle to the propeller axis.

In FIG. 10, a mass L is connected to an arm OL and is turnable with the arm about the propeller axis.

In FIG. 11, a mass P is attached to a rod OP which is tilted in the desired direction about the propeller axis along a plane at right angle thereto.

The tilting is accomplished by rotating the rod OP in the direction designated by arrows shown in FIGS. 11 and 27. As shown more clearly in FIG. 27, a horizontal plane perpendicular to the vertical axis of the aircraft is designated by a circle R. A point S on an extended axis of the rod OP is shown projected vertically downwardly onto the circle R at point T. The point P is shown projected vertically downwardly on the line OT on the plane R at point V. The fixed mass P, at the end of the rod OP, can be placed in any polar coordinate designated by the arrows shown on FIGS. 11 and 27. If in practice the axis OP of the rod cannot travel through the paths shown by the two arrows due to an obstacle, as for instance the engine, it is possible to use any structure, such as for example linkages with joints, so as to go around the obstacle and therefore permit the mass P to be placed in any desired position.

The weight shifting may also be brought about by other means, for instance by shifting the position of the body of the pilot, if the craft carries and is controlled by a pilot.

Figure 12:
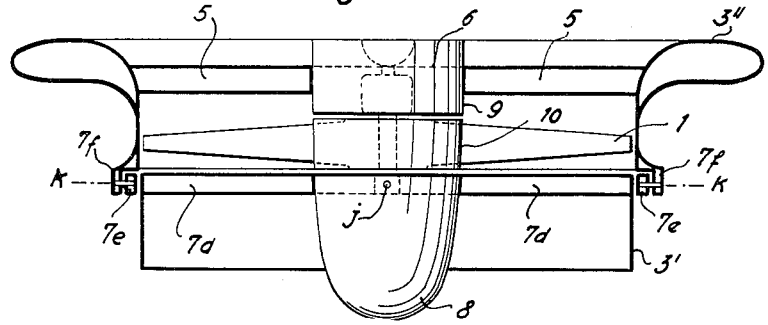
FIG. 12 is a schematic sectional view, similar to FIG. 1, but embodying a further modification.
Figure 13:
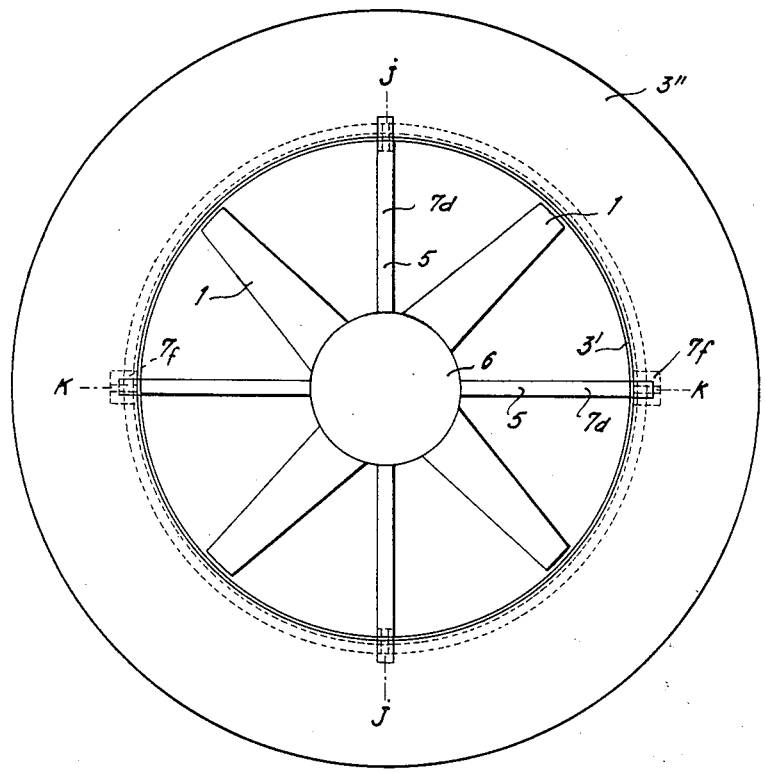
FIG. 13 is a plan view thereof.

A further modification of a stabilizing and piloting by control of the air stream, rather than by weight shifting, is shown in FIGS. 12 and 13. In accordance with that modification, all or part of the cylindrical cowling portion 3' of the collector is tiltable in all directions, in order to displace angularly the air flow. The diameter of the lower portion of the collector is sufficiently small so as to provide for tilting clearance. Reinforcing ribs 7d are provided in the lower portion 3' which also support the case 8, and can be tilted about the axis J—J. Reinforcement ribs 7d are aligned diametrically and journalled in a ring 7e which surrounds the lower portion 3', and the ring 7e can be tilted about the axis K—K at right angle to the axis J—J. This tilting of the ring 7e is made possible by journalling of diametrically aligned ring supports 7f in extensions of the collector 3. In this manner, a universal joint is created permitting the lower portion 3' to be tilted for a small angle of a few degrees in any direction. The actual tilting may be carried out by suitable well-known control means (not shown). By this tilting, the air stream is guided and, accordingly, stabilizing and piloting of the aircraft is rendered possible.

Flight in a horizontal direction is made possible by inclining the aircraft with respect to the vertical while increasing, as desired, the thrust of the propeller 1 by means of the motor 2. The horizontal component of the thrust then produces the flight in the horizontal direction. This inclination can be brought about either by using the stabilizer devices for the vertical flight as described above, or by other means such as described below.

The collecting portion 3" is profiled according to a wing air foil with a downwardly bent trailing edge. The leading or top edge forms the lips of the convergence of the collecting portion 3", while the trailing edge is connected to the cowling portion 3' of the collector 3.

Figure 14A:
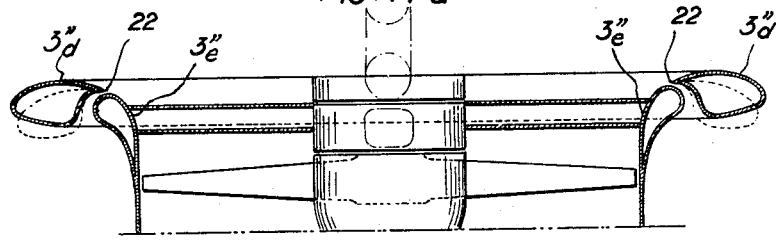
FIG. 14a is a schematic elevational view partly in section, showing a modification.
Figure 16A:
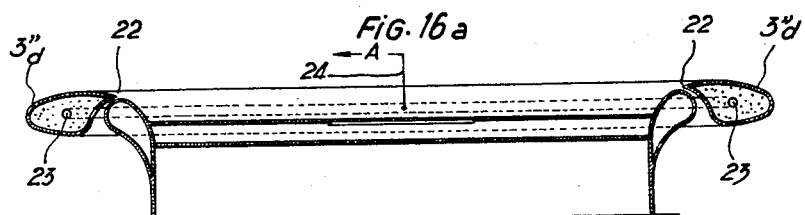
FIG. 16a is a schematic sectional view, similar to FIG. 1, but embodying still another modification.

It is desirable that no breakaway of flow occurs in the airstream along the convergence while the aircraft hovers or is in flight. For this purpose, the collecting portion 3" may have the leading edge equipped with one or more slots 22 that are formed between two elements 3"d and 3"e (FIG. 14a). The slots 22 can be arranged singly (FIGS. 14a, 16a) or in plurality (FIG. 17), and may comprise air intake devices or air blowing devices designated 27 (FIG. 18) which may be used simultaneously or separately.

Figure 18:
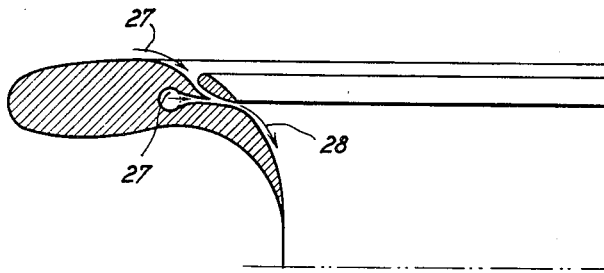
FIG. 18 is a sectional view, similar to FIG. 17, but showing a further modification.
Figure 19:
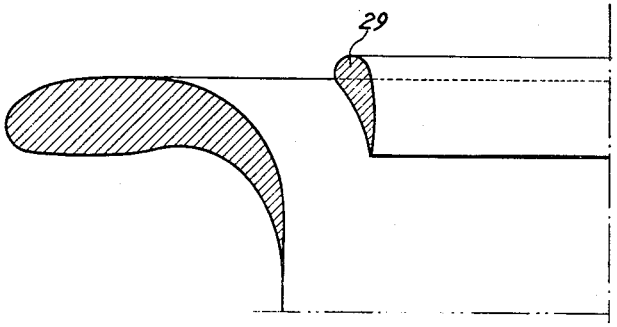
FIG. 19 is a sectional view, similar to FIG. 17, but showing another modification.

Air may be taken in and so compressed that it will escape with a speed near the speed of sound and in escaping will draw in outside air (arrow 27) and eject the mixture into the collector interior (arrow 28, FIG. 18). It is also possible to use at the inside of the convergence of the collecting portion 3" a ring member that is profiled as at 29 (FIG. 19). The ring 29 will give a better aerodynamic air flow and a better air distribution within the interior of the aircraft between the ring 29 and the collector.

Figure 17:
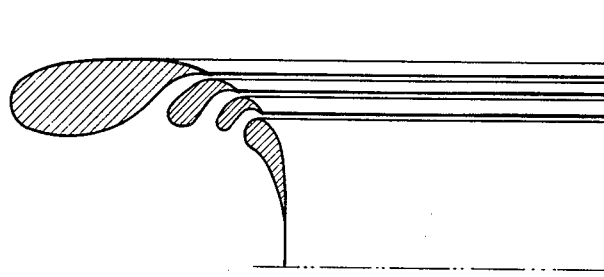
FIG. 17 is a large scale fragmentary schematic sectional view showing a modified detail of the collecting portion of the collector.

As outlined before and referring to FIGS. 17 and 22, it can be understood that by using the slots as shown in these views it will improve the aerodynamic efficiency of the aircraft. The reason is that the air flows over the concave and convex surfaces of the collector, producing a differential of pressure between the surfaces. The slots on the convex surface therefore prevent the stream of air from detaching from the convex surface. This gives a smoother air flow in through the aircraft.

Another method of preventing the detachment of the air stream from the convex surface of the collector, as outlined before, is by blowing air into the interior of the collector. Referring to FIG. 23, compressed air, supplied by the engine compressor, is distributed by a circular collector tube 27 and sent almost tangentially through a slot or a series of small holes 28 into a slot 33 of the lip of the collecting portion 3''. The compressed air going through the slot 33 at about the speed of sound pulls a larger quantity of air by suction in a direction shown by arrow 30. Due to this the air stream travels generally in a direction shown by arrow 32 close to the surface of the collector as in the case of the slotted collectors described above.

Figure 14B:
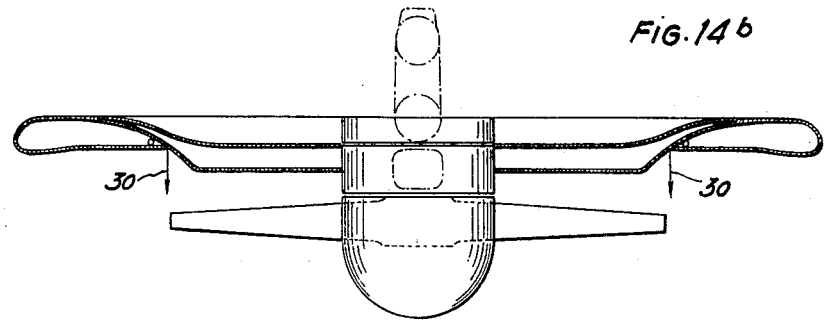
FIG. 14b is a view similar to FIG. 14a but showing a further modification.

For air blowing, an air blow device 30 (FIG. 14b) may be placed near the collecting portion 3' of the collector 3, forming a flow flap, and the cowling portion may then be dispensed with.

The blowing arrangement described above can be utilized to form a cylindrical fluid curtain around the aircraft, as shown in FIG. 14.

Stabilizing or piloting control may be achieved by the aforesaid air intake or air blowing devices 27, when the air action is regionally applied.

Figure 15A:
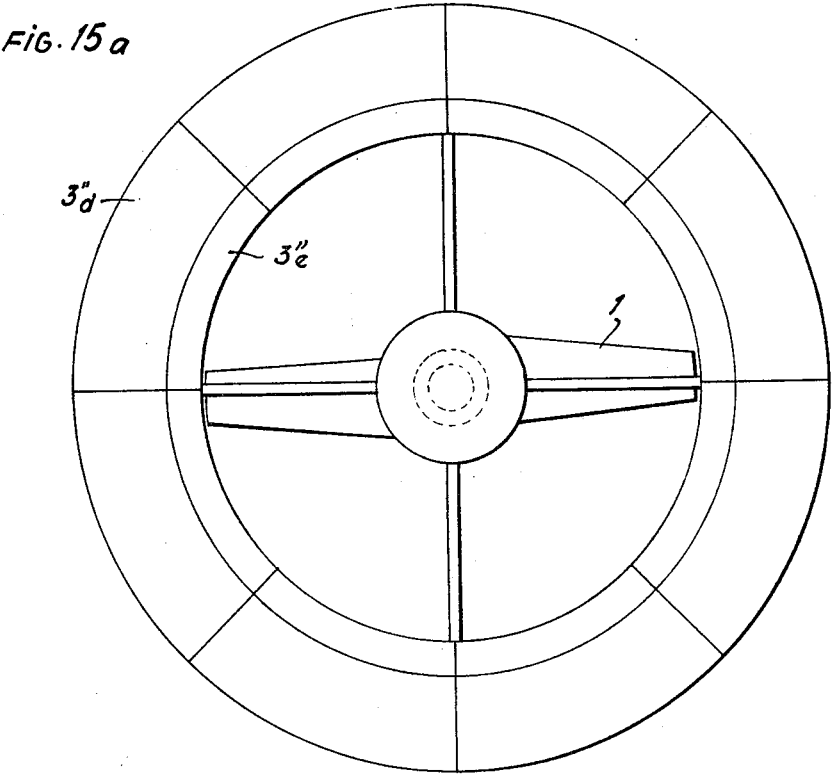
FIG. 15a is a plan view of a craft similar to that of FIG. 14a, but embodying a further modification.
Figure 15B:
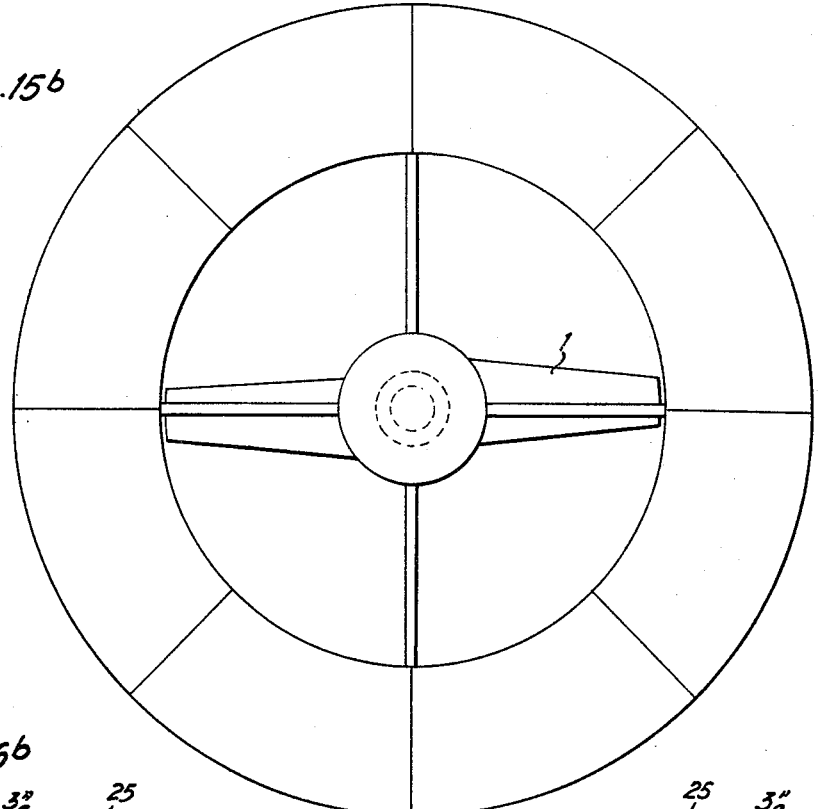

Directional flight may also be controlled by deformation of the collecting portion 3''. To that end, the collecting portion 3'' may comprise a series of sections separated by small radial spaces or cuts (FIGS. 15a, 15b). By inclining one or more of these sections, the craft may be inclined in any azimuth desired by the operator. Furthermore, it is possible to incline diametrically opposite sections in opposite directions, one upward and the other downward, taking on during the flight the controls similar to the controls in the tail units of a conventional airplane. The lateral sections of the collecting portion 3'' (lateral in relation to the direction of flight) may also be deflected, thus producing a warp control to maintain the lateral balance of the craft and to permit turning.

The craft thus does not have any preferred direction of horizontal flight, but may move in any direction and be made to change directions rapidly.

The aforesaid deformation of the collecting portion 3'' may be made in accordance with several alternatives described below.

For instance, the outermost portion 3''d (FIG. 14a) of the collecting portion 3'' may be inclined by a rotation about the trailing edge or about a line near the trailing edge. This outermost portion 3''d may be made flexible and elastic so that the desired deformations can be brought about without any interruption, affording a better aerodynamic control by suppressing marginal turbulences.

The outermost portion 3''d may also be made similar to an automobile tire (FIG. 16a), being practically non-deformable in the cross sectional plane but possessing a certain flexibility peripherally. A ring 23 inside the outermost portion 3''d and having elastic connections therewith, is connected to a rod 24. Any stress in the direction A will slant the ring 23 into the desired direction, and will deform accordingly the edge of the outermost portion 3''d.

Figure 16B:
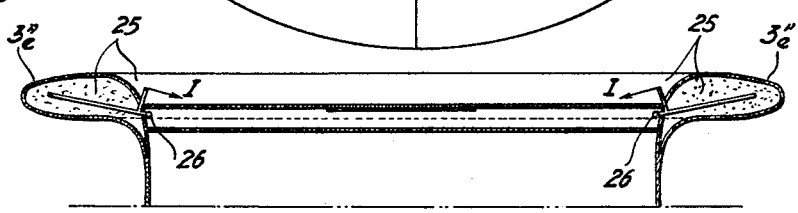
FIG. 16b is a sectional view similar to FIG. 16a, but showing a still further modification.

Alternatively, the outermost portion 3''e (FIG. 16b) may be provided with a set of levers 25 pivoted at 26, and each lever is sunk into the outermost portion which is elastic. If a force I is exerted against any of the levers 25, deformation of the outermost portion 3''e will follow. The levers 25 are installed at regular intervals throughout the orbit of the outermost portion 3''e of the collecting portion 3''. It is also possible to suppress the blast 30 (FIG. 14b) in certain sections, or to change its direction, to stabilize the aircraft or to maneuver it.

More specifically, the method of piloting the aircraft may be best described by referring to FIGS. 22 and 24–27.

The sections 3''d of the collector may be flexible and elastic. In this way the desired deformation can be brought about gradually around the collector and in this way reduce the turbulence that may arise at the rim of the individual sections. Section 3''d for instance, referring to FIG. 24, may resemble an automobile wheel with a transverse section that cannot be deformed, in order to present a certain flexibility on the periphery. A ring 52 is placed in the section 3''d and elastically connected therewith to a lever 51. Pulling the lever 51 in a direction shown by H will incline the ring 52 in the direction of the push and consequently deform the section 3''d in the same direction. The section 3''d of the collector may be filled with an elastic material such as soft rubber. This will assure an elastic connection between the ring 52 and the section 3''d.

The ring 52 may be connected to the lever 51 by elbow-shaped arms 54 as shown in FIG. 24. Hinges 55 similar to the hinges 41 of FIG. 22 maintain the necessary spacing of the sections 3''d and 3''e.

Referring to FIGS. 25 and 26, a modified control may be provided. A series of elbow-shaped levers 56, embedded in the soft rubber within 3'' may be pivoted around an axis 57 fixed to the cowling. These levers may be placed at regular intervals around section 3''. If a force I is exerted on one of the levers 56, a downward deformation is produced depending on the direction of the force as outlined before. The connections between lever 51 and the lever 56 may consist of a series of elbow-shaped stems 58, rigidly connected at 51 and movable at 56 by rotary joints 59.

Figure 20:
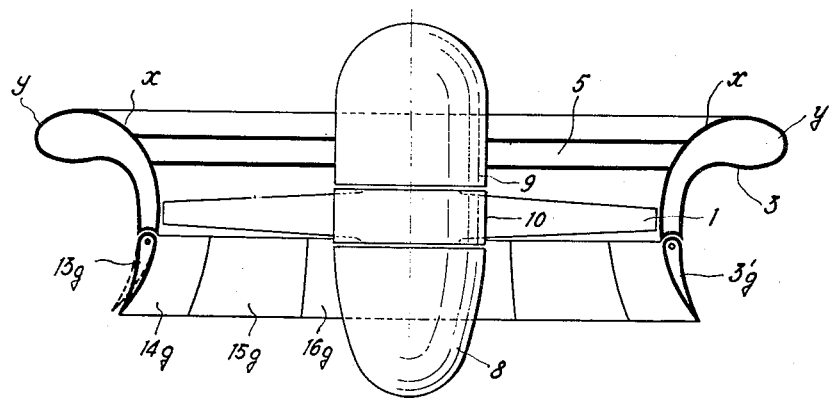
FIG. 20 is a schematic sectional view, similar to FIG. 1, but embodying a further modification.
Figure 21:
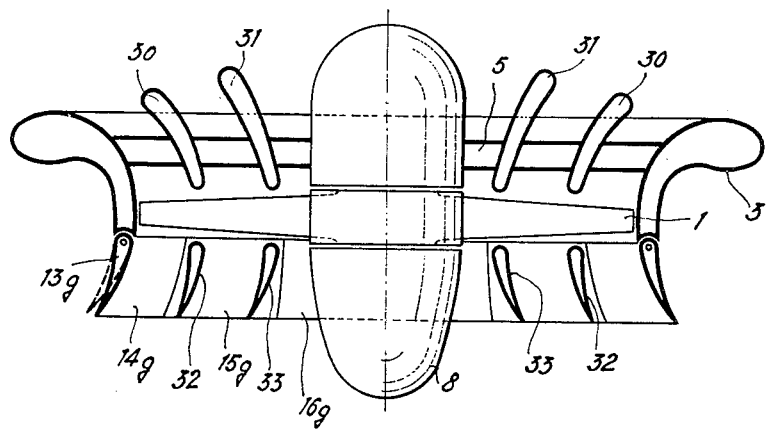
FIG. 21 is a schematic sectional view, similar to FIG. 20, but embodying still another modification.

The collector 3, as best shown in FIGS. 20 and 21, may have internally a "Venturi" shape, being formed in the direction of thrust as a converging-diverging nozzle, while the wall of the collector in its entirety is profiled as an air foil.

The aerodynamic shape of the collector 3 renders it possible to subject the incoming air in a depression zone disposed between the points $x$ and $y$ (FIG. 20) to a greater depression than in a less aerodynamically favorably shaped collector, resulting in a greater lifting force for the same propeller power. The air may be guided into the collector 3 by guide means, such as annular guides or deflector flaps 30, 31, 32 and 33 (FIG. 21) which may be arranged on either or both sides of the propeller 1.

The lowermost divergent portion of the collector 3 may be composed of air foil shaped section 3g . . . 16g (FIG. 21), and each of these sections is movable, alone or together with all the others, about a hinge axis disposed in a plane that intersects at right angle the propeller axis. If controlled as a unit, these sections regulate the dynamic efficiency of the craft; if controlled individually, they help to pilot the craft.

To make it turn in flight, the operator will incline the aircraft into the new direction by means of any of the above described devices. In making turns, the horizontal component of the lift thrust is directed towards the center of the curvature and opposed to the centrifugal force, thereby reducing the radius of gyration.

Any and all of the foregoing means may be controlled by suitable arrangement, either directly by the pilot carried by the craft, or by means of suitable well-known remote control devices.

I do not limit myself to the specific exemplifications shown in the drawing and described in the description, for other modifications will suggest themselves, from the principles thereof to a skilled person.

Having thus described the invention, what I claim as new and desire to be secured by Letters Patent is as follows:

1. In an aircraft having a propeller the axis of which being substantially vertical, a collector guiding the airstream downwards energized by the propeller and supporting the motor driving the propeller, said collector being co-axial with the propeller axis and having an enlarged collecting portion disposed upstream of the propeller, stabilizing and piloting means comprising in combination a thickened and deformable elastic rim at the top edge of the collector, and means to deform by parts said rim of the collecting portion for stabilizing and piloting the aircraft.

2. In an aircraft having a propeller the axis of which being substantially vertical, a collector guiding the airstream downwards energized by the propeller and supporting the motor driving the propeller, said collector being co-axial with the propeller axis and having an enlarged collecting portion disposed upstream of the propeller, stabilization and piloting means comprising in combination a thickened and deformable elastic rim at the top edge of the collector, a non-elastic ring placed within said rim and a plurality of levers connected to the circumference of said ring and operable to deform the rim for stabilizing and piloting the aircraft.

3. In an aircraft having a propeller the axis of which is substantially vertical, a collector guiding the air-stream downwards energized by the propeller and supporting the motor driving the propeller, said collector being co-axial with the propeller axis and having an enlarged collecting portion disposed upstream of the propeller, stabilization and piloting means comprising in combination a thickened and deformable elastic rim at the top edge of the collector, a plurality of levers sunk into said rim and actuating means connected to each of said levers operable to deform the rim for stabilizing and piloting the aircraft.

4. In an aircraft having a propeller, a motor in driving connection with the propeller, and a collector for the air stream energized by the propeller said collector being co-axial with the propeller axis and rigidly supporting said motor, in combination, said collector comprising a circular cowling portion adjacent the propeller and having an internal diameter only slightly in excess of the propeller diameter, a collecting portion connected to said cowling portion and disposed upstream of the propeller and defining a convergence guiding air towards the propeller, compensating flap means connected to said collector and disposed in the air stream and operable to oppose the reaction rotation moment of the motor and of the collector, said collector having a deformable elastic rim, a non-elastic ring placed within said rim, and a plurality of levers connected to the circumference of said ring and operable to deform the rim for stabilizing and piloting the aircraft.

5. In an aircraft having a propeller, a motor in driving connection with the propeller, and a collector for the air stream energized by the propeller said collector being co-axial with the propeller axis and rigidly supporting said motor, in combination, said collector comprising a circular cowling portion adjacent the propeller and having an internal diameter only slightly in excess of the propeller diameter, a collecting portion connected to said cowling portion and disposed upstream of the propeller and defining a convergence guiding air towards the propeller, compensating flap means connected to said collector and disposed in the air stream and operable to oppose the reaction rotation moment of the motor and of the collector, said collector having a deformable elastic rim, a series of levers placed in the periphery of said rim, and actuating means connected to each of said levers operable to deform the rim for stabilizing and piloting the aircraft.

References Cited in the file of this patent

UNITED STATES PATENTS

| | | |
|---|---|---|
| 1,104,542 | Porter | July 21, 1914 |
| 1,123,589 | Porter | Jan. 5, 1915 |
| 2,008,464 | Nishi | July 16, 1935 |
| 2,510,561 | Laval | June 6, 1950 |
| 2,843,338 | Streib | July 15, 1958 |
| 2,922,277 | Bertin | Jan. 26, 1960 |
| 2,936,972 | Zinavage | May 17, 1960 |

OTHER REFERENCES

Aviation Week, Jan. 21, 1957, page 107.